United States Patent
Iida

(12) 
(10) Patent No.: US 6,545,959 B1
(45) Date of Patent: Apr. 8, 2003

(54) OPTICAL DISC APPARATUS AND METHOD FOR READING INFORMATION USING INTERFERENCE INFORMATION FROM ADJACENT ADDRESSES

(75) Inventor: Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/711,558

(22) Filed: Nov. 13, 2000

(30) Foreign Application Priority Data

Nov. 17, 1999 (JP) ............................................. 11-327204

(51) Int. Cl.$^7$ ................................................. G11B 5/09
(52) U.S. Cl. ................................ 369/47.17; 369/44.26; 369/44.41
(58) Field of Search ........................... 369/30.03, 30.1, 369/30.2, 44.26, 44.41, 47.15, 44.32, 32.01, 44.13, 47.17, 53.13, 53.14, 53.31, 53.33

(56) References Cited

U.S. PATENT DOCUMENTS 5,754,505 A * 5/1998 Saeki ........................ 369/44.37

\* cited by examiner

Primary Examiner—Paul W. Huber
(74) Attorney, Agent, or Firm—Oblon, Spivak, McClelland, Maier & Neustadt, P.C.

(57) ABSTRACT

The objective of the present invention is to provide an optical disc recording and reproducing apparatus in which the target pre-format address and the recorded information can be read from the optical disc with excellent reproducibility, and the crosstalk between adjacent pre-grooves can be prevented, even if the light beam is applied across adjacent information recording layers in accordance with the increase in a storage density of the optical disc. The optical disc recording and reproducing apparatus 100 for reading recorded information from an optical disc 10 in which information is recorded based on pre-format addresses, include a light output device 6 for emitting a light beam L to the optical disc 10, and a photodetector 7 for detecting a return light L' by a light beam applied to an optical disc in such a manner that a target pre-format address and recorded information are distinguished from interference information by the pre-format addresses adjacent to the target pre-format address at its inner and outer peripheral sides.

3 Claims, 10 Drawing Sheets

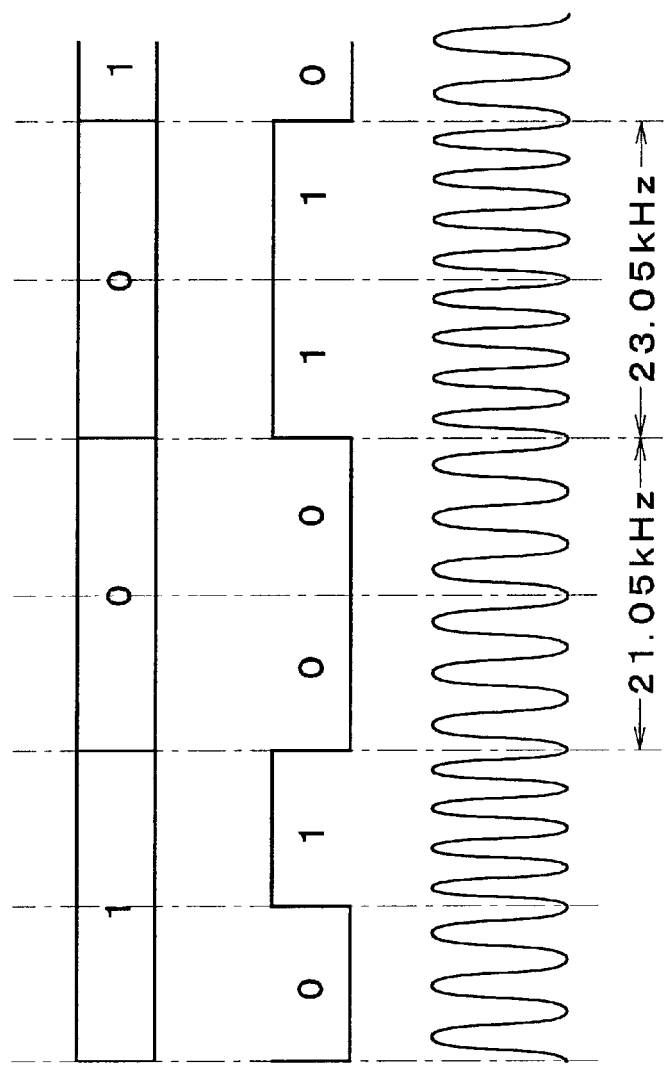

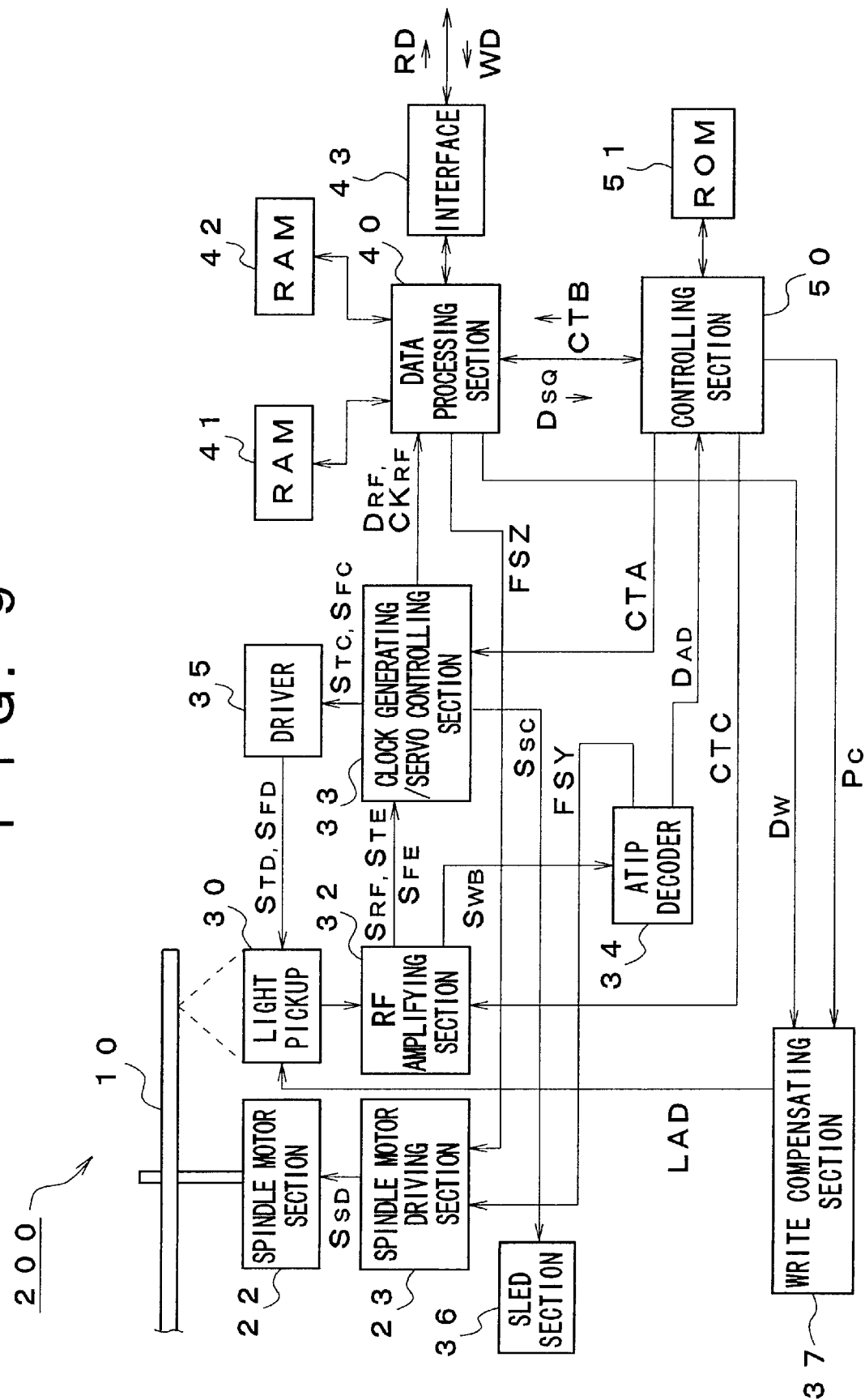

OPTICAL DISC APPARATUS AND METHOD FOR READING INFORMATION USING INTERFERENCE INFORMATION FROM ADJACENT ADDRESSES

BACKGROUND OF THE INVENTION

1. Field of the Invention

The present invention relates to an optical disc recording and reproducing apparatus preferable when used for a writable optical disc such as a write once optical disc (CD-R) and a rewritable optical disc (CD-RW), and a method for reading information.

Specifically, in the present invention, a photodetector detects a return light of a light beam applied to an optical disc in such a manner that a target pre-format address and recorded information are distinguished from interference information by the pre-format addresses adjacent to the target pre-format address at its inner and outer peripheral sides. With this arrangement, the target pre-format address and the recorded information can be read from the optical disc with excellent reproducibility, and the crosstalk between adjacent pregrooves can be prevented, even if the light beam is applied across adjacent information recording layers in accordance with the increase in a storage density of the optical disc.

2. Description of the Related Art

In recent years, as information media for editing and recording audio information in such a manner as to suit the preferences of listeners, writable optical discs such as write once optical discs (CD-R) and rewritable optical discs (CD-RW) standardized in ISO/IEC13490-1 are increasingly used. In each of these optical discs 10, as shown in FIG. 1A, grooves 1 for guiding a light beam (hereinafter, referred to as pregrooves) are formed, and a positioning method referred to as a tracking servo is employed. The tracking servo is a mechanism where pits and projections constituting lands 2 formed on both sides of each pregroove 1 are detected to decide the position of an optical pickup, so that the desired pre-format address is accurately irradiated with a laser beam.

Sloped surfaces of the land, which coincide to side surfaces of the pregroove 1, are for med with a slight wobble in the form of sine wave in-phase with each other as shown in FIG. 1B. The wobble signal indicating the wobble component has been subjected to FM modulation. In the wobble signal, time axis information which indicates the position on the optical disc 10, and a recommended value of the power of the laser beam optimum for recording are encoded.

This time axis information is referred to as MTIP (Absolute Time In Pregroove) information, and is written as an absolute time in the signal recording region (i.e. a program region) of the optical disc 10 along a direction from the starting point at its inner peripheral side toward its outer peripheral side. The ATIP information is written in the processing of the CD-R an d CD-RW. The ATIP information is written in the optical disc 10 such as CD-R and CD-RW in a modulation mode referred to as bi-phase modulation mode. In this mode, a baseband modulation is conducted where, depending on whether the waveform of the last pulse signal constituting the error correction information of the immediately preceding pre-format address ends at a high level or low level, the pre-format address in the next frame is connected without being inverted, or the pre-format address is inverted and connected.

The ATIP information is written, for example, in the side surfaces Us, Ut of the pregroove 1 between two lands 2a, 2b shown in FIG. 1B. That is, the ATIP information is written in the side surface Us of the land 2a located at the inner peripheral side of the pregroove 1 in which data is recorded, and in the side surface Ut of the land 2b located at the outer peripheral side of the pregroove 1 in such a manner that the ATIP information written in the side surface Us is synchronous to the ATIP information written in the side surface Ut.

Therefore, the ATIP information can be read as a wobble signal by detecting the reflected light from the main spot 4 on the wobble formed in the lands 2a, 2b by two light receiving elements split in the direction of track. The broken double line circles in FIG. 1B show spot diameters of the light beam applied to the optical disc having a standard density. The two-dot long and two short dashes line circles show a light beam of which irradiation diameter is relatively enlarged as the pregrooves are formed so as to be closer to each other in accordance with the increase in a storage density of the optical disc 10. This problem arises because there is a limitation on enlarging the spot diameters of the light beam.

The wobble signal is produced in such a manner that its center frequency becomes 22.05 kHz for example, when the optical disc 10 is rotated at a standard velocity (CLV) of a compact disc (CD). One sector of the ATIP information is constituted in such a manner as to coincide to one data sector after the signal is recorded. Therefore, at the time of recording information, the pregrooves 1 are irradiated with a light beam with a predetermined intensity and information is written therein while the sector of the ATIP information is synchronous with the data sector.

In a conventional method, when a signal is recorded in the optical disc 10, as shown by a broken line in FIG. 1B for example, a pit 61 is formed at a main spot 4 created in a three-beam method, and in this state, the return light from the main spot 4 is split and received in the photodetecting section 71 shown in FIG. 2. In the photodetecting section 71, a light receiving signal A from the light receiving element PD1 such as a photodiode which constitutes a four split photodetector 711, and a light receiving signal D from the light receiving element PD4 similar to the light receiving element PD1 are added to each other to produce an addition signal A+D. At the same time, a light receiving signal B from the light receiving element PD2, and a light receiving signal C from the light receiving element PD3 are added to each other to produce an addition signal B+C. In the photodetecting section 71, the latter addition signal B+C is subtracted from the former addition signal A+D to obtain a wobble signal.

In the above-described method, furthermore, the light receiving signals A to D from the four light receiving elements PD1 to PD4 in the photodetector 711 are also added to each other to produce an RF signal (A+B+C+D). At the same time, a tracking servo is controlled by use of a light receiving signal E from the light receiving element PD5, a light receiving signal F from the light receiving element PD6 of the two split photodetector 712, and a light receiving signal G from the light receiving element PD7, and a light receiving signal H from the light receiving element PD8 of the two split photodetector 713.

When the return light from the main spot 4 is employed, there arises a problem that the degree of reflection is changed in the process of forming the pit 61, and the amount of light of the return light from the main spot 4 is fluctuated. In an attempt to avoid such a problem, the signal levels of the light receiving signals A to H from the photodetecting section 71 are adjusted by use of a high speed AGC, so as to eliminate the influence of the fluctuation of the amount of light. Alternatively, the ratio between the addition value of the light receiving signal A from the light receiving element PD1 and the light receiving signal D from the light receiving element PD4, and the addition value of the light receiving signal B from the light receiving element PD2 and the light receiving signal C from the light receiving element PD3 by use of a divider, so as to eliminate the influence of the fluctuation of the amount of light. In the state where the influence of the fluctuation of the amount of light is eliminated in these manners, a wobble component is taken out to obtain time axis information and the like. Furthermore, in the information reading method according to the conventional example, time axis information and the like is obtained by sampling and holding an RF signal when the power of the laser beam is lowered from the signal writing level to the signal reading level.

However, if information is read based on the pre-format addresses which are written in the bi-phase modulation mode as it is without conducting any processing in the recent situation where the lands 2a, 2b are arranged at narrower pitches (hereinafter, also referred to as track pitches in some cases) P in accordance with the increase in the storage density of the optical disc 10 (hereinafter, referred to as a disc-shaped record medium in some cases), the light beam of which irradiation diameter is relatively enlarged as the pregrooves are formed so as to be closer to each other is applied across the adjacent pregrooves (see FIG. 1B).

In other words, even if the main spot 4 is in the shape of a complete circle, when the spot diameter is larger than the track pitches P, a leakage from the adjacent track occurs. In this case, there is much fear that a crosstalk is generated. The crosstalk causes a phase modulation to create jitter, and as a result, the signal-noise (S/N) ratio is lowered.

As a result, when the bi-phase signal constituting the target pre-format address at the reading point is superposed onto the bi-phase signal of the other pre-format address adjacent to the target pre-format address, there arises a problem that the phase difference therebetween is large, and larger jitter is created as the period of the high-level is shorter.

In addition, if it is attempted to obtain time axis information by use of the return light from the main spot 4 while forming the pit 61 in the main spot 4, a high speed AGC and a divider are required, and the structure of the apparatus becomes complicated. When the signal is written at a speed higher than a standard speed, the light amount of return light is fluctuated by the influence of the formation of pit, even if the power of the laser beam is lowered from the signal writing level to the signal reading level by sampling and holding the signal. In this case, there is a fear that the time axis information cannot be read accurately.

The present invention has been conducted to solve the above-described problems of the prior arts, and the objective thereof is to provide an optical disc recording and reproducing apparatus from which the target pre-format address and the recorded information can be read with excellent reproducibility, as well as being capable of preventing the occurrence of crosstalk in adjacent pregrooves, even if a light beam is applied across adjacent information recording layers in accordance with the increase in the storage density of the optical disc, and a method for reading information.

The above-described problems can be solved by an optical disc apparatus for recording information and reproducing the recorded information in an optical disc having addresses formed beforehand, and the information is to be recorded into the optical disc based on the addresses. The optical disc apparatus includes: a light output device for emitting a light beam to the optical disc; and a photodetector for detecting a return light which is reflected by the optical disc and contains information to be read, in such a manner that a target address and the recorded information are distinguished from interference information which is owing to addresses adjacent to the target address at its inner and outer peripheral sides.

According to an optical disc apparatus of the present invention, when the information which has been recorded in the optical disc based on the addresses is read therefrom, a light beam is applied from the light output device to the optical disc. The photodetector detects a return light of the light beam which reflects the information to be read from the optical disc in such a manner that the target address and the recorded information are distinguished from the interference information which is owing to the addresses adjacent to the target address at its inner and outer peripheral sides.

For example, four light receiving elements arranged vertically and horizontally in a center area around the light receiving axis of the photodetector detect the component of the return light which reflects the target pre-format address and the recorded information. On the other hand, the other four light receiving elements, two of which are arranged horizontally above the four light receiving elements, and the rest two of which are arranged horizontally below the four light receiving elements, detect the component of the return light which reflects the interference information by the pre-format addresses adjacent to the target pre-format address at its inner and outer peripheral sides.

The output from the photodetector is input into the signal generator. The signal generator produces an RF signal and a wobble signal based on the output from the four light receiving elements arranged vertically and horizontally in a center area around the light receiving axis of the photodetector. In addition, the signal generator produces a tracking error signal or a focus error signal based on the output from the eight light receiving elements.

Accordingly, the interference information by the pre-format addresses adjacent to the target pre-format address at its inner and outer peripheral sides is removed from the information read from the optical disc, and whereby only the recorded information of the target pre-format address can be taken out. As a result, even if the light beam is applied across the information recording layers adjacent to each other in accordance with the increase in the recording density of the optical disc, the occurrence of crosstalk can be prevented without damaging the function of tracking error detection and the function of focus error detection.

According to a method for reading information of the present invention, information is read from an optical disc having addresses formed beforehand, and the information is recorded in the optical disc based on the addresses. The method includes the steps of: irradiating the optical disc with a light beam; and detecting a return light reflected by the optical disc in such a manner that a component of the return light which reflects a target address and the recorded information are distinguished from a component of the return light which reflects interference information which is owing to addresses adjacent to the target address at its inner and outer peripheral side.

According to the method for reading information of the present invention, the interference information by the pre-format addresses adjacent to the target pre-format address at its inner and outer peripheral side is removed from the information read from the optical disc, and whereby only the recorded information of the target pre-format address can be taken out. As a result, even if the light beam is applied across the information recording layers adjacent to each other in accordance with the increase in the recording density of the optical disc, the occurrence of crosstalk can be prevented without damaging the function of tracking error detection and the function of focus error detection.

BRIEF DESCRIPTION OF THE DRAWINGS

FIGS. 7A to 7C are waveform diagrams showing an exemplary relationship between ATIP information, a bi-phase signal DBP, and a wobble signal SWB;

FIG. 9 is a block diagram showing an exemplary structure of an optical disc recording and reproducing apparatus 200 according to an example to which an optical pickup 30 is mounted;

DESCRIPTION OF THE PREFERRED EMBODIMENT

Next, an optical disc apparatus and a method for reading information according to an embodiment of the present invention will be described with reference to drawings.

(1) Embodiment

Figure 1A:
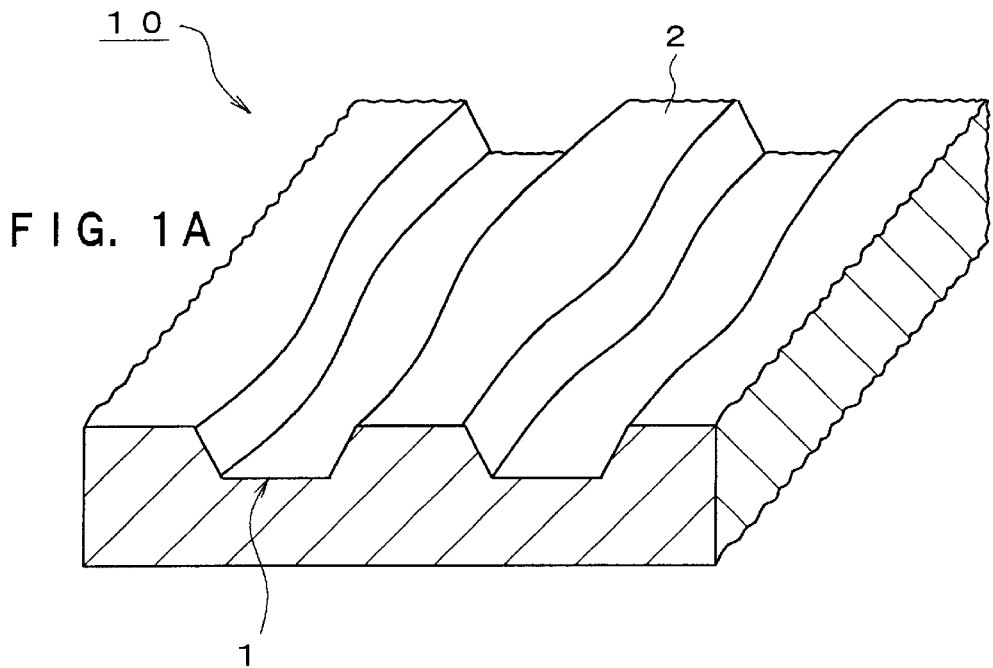
FIG. 1A is a drawing showing an exemplary structure of an optical disc 10 according to a conventional example.
Figure 1B:
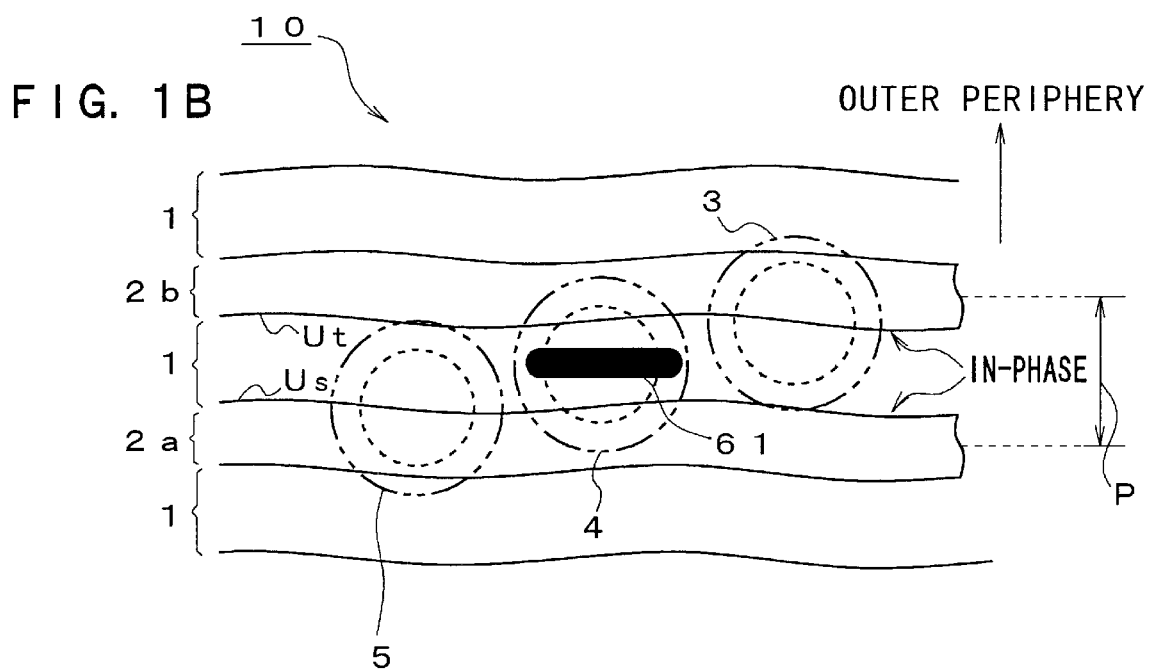
FIG. 1B is a diagram showing an example of the irradiation of a light beam.
Figure 2:
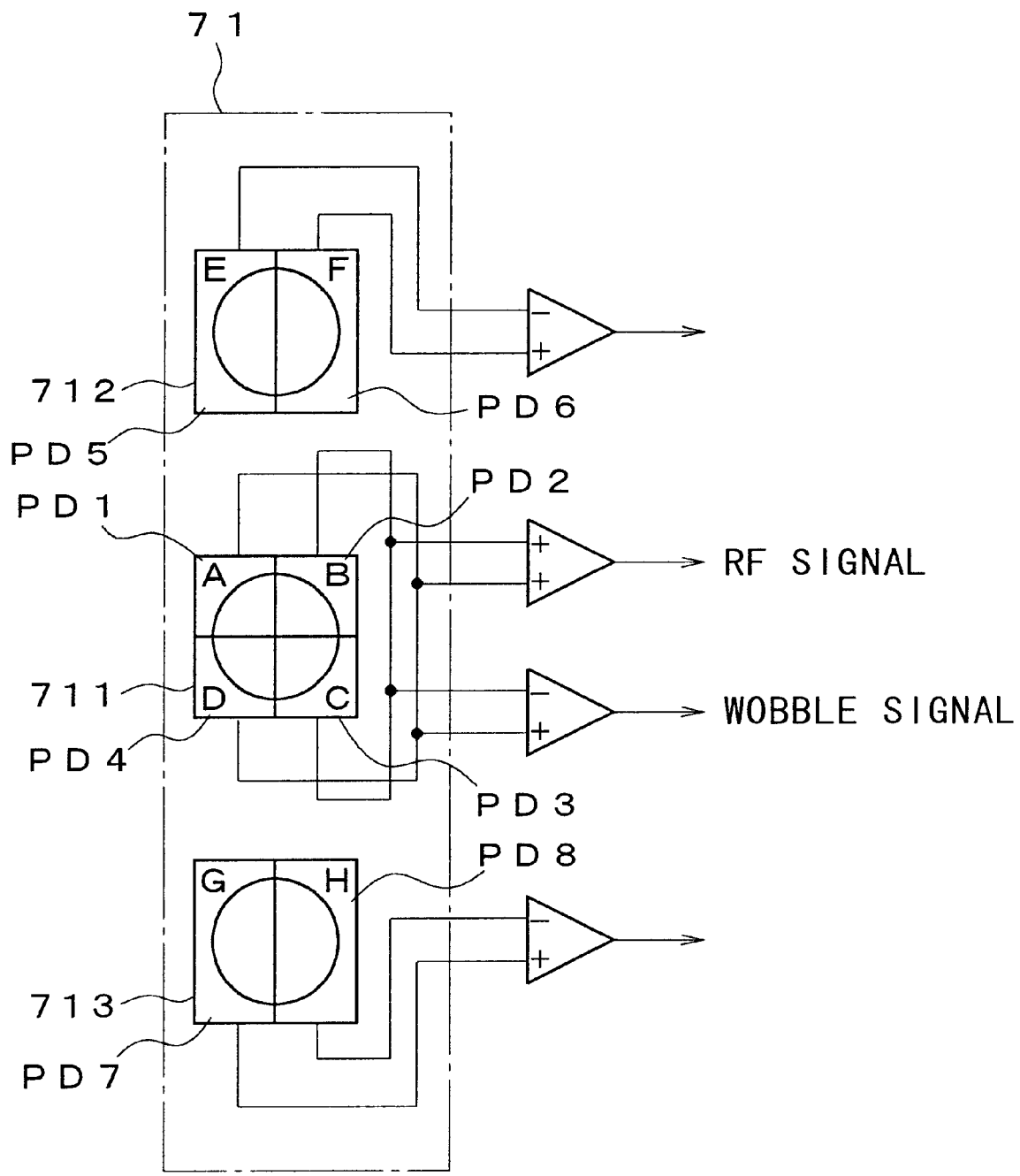
FIG. 2 is a diagram for illustrating a method for reproducing a wobble signal in a photodetecting section 71 according to a conventional example.
Figure 3:
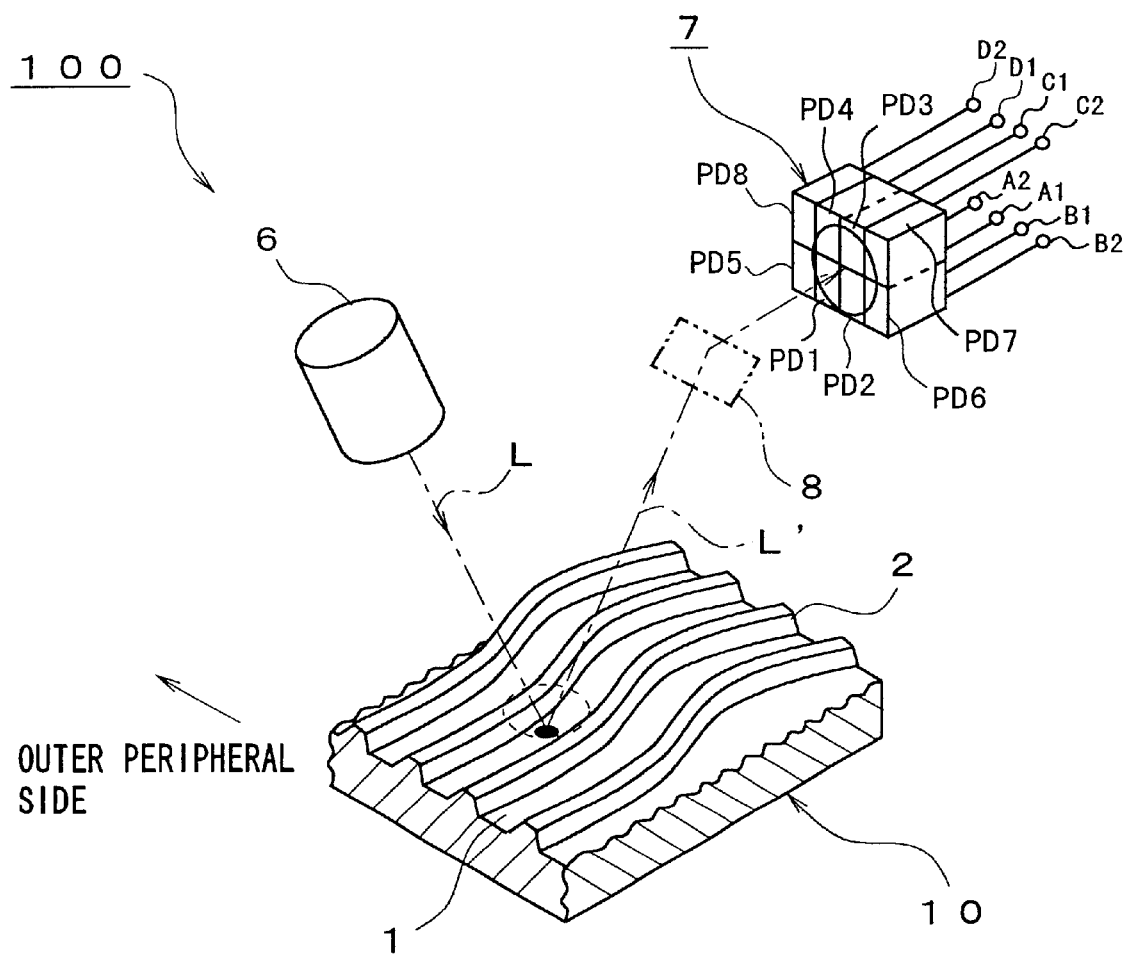
FIG. 3 is a perspective view showing an exemplary structure of an optical disc recording and reproducing apparatus 100 according to an embodiment of the present invention.
Figure 4:
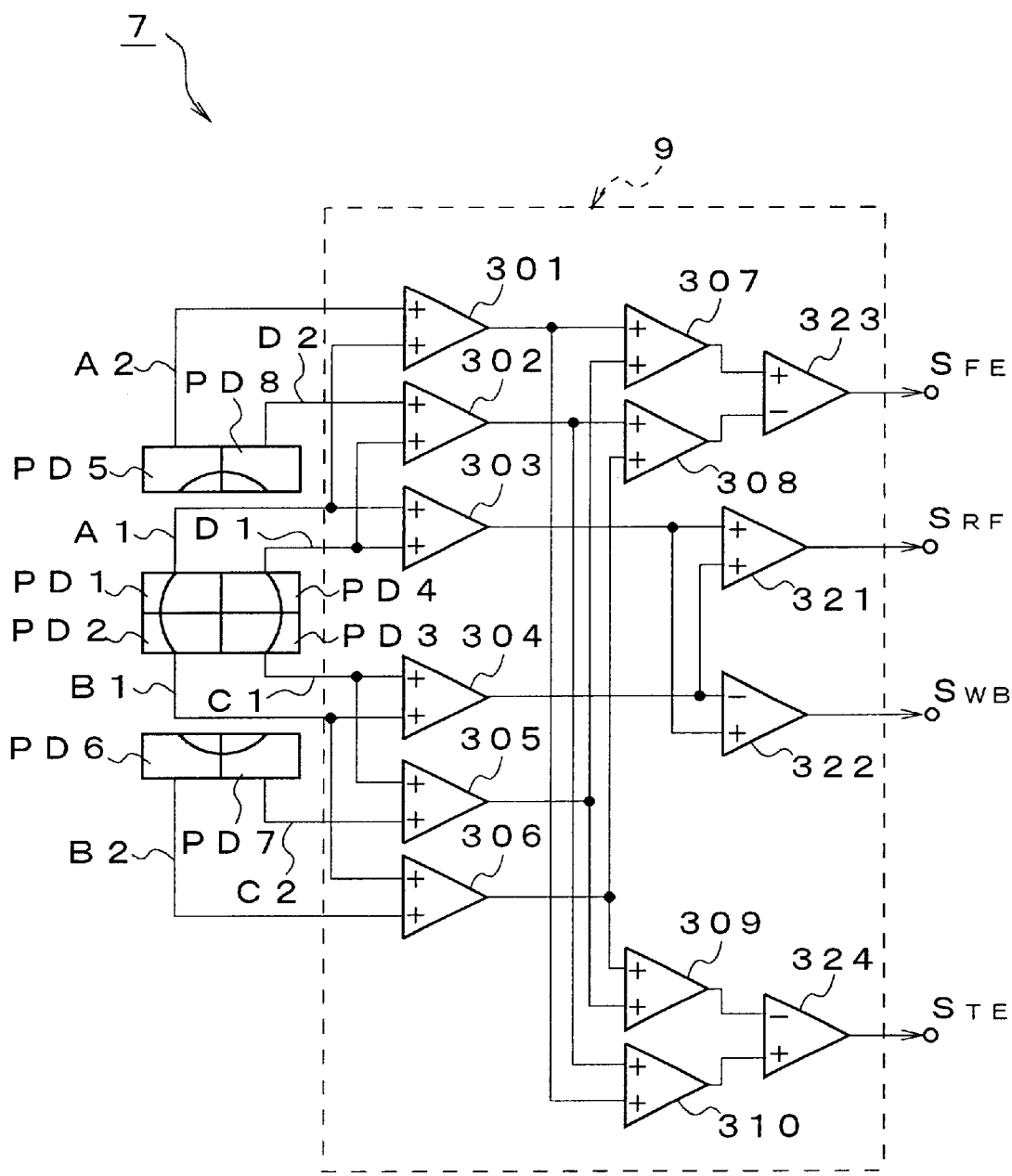
FIG. 4 is a block diagram showing an exemplary structure of a photodetector 7 and a signal generator 9 in the optical disc recording and reproducing apparatus 100.

FIG. 3 is a perspective view showing an exemplary structure of an optical disc recording and reproducing apparatus 100 according to an embodiment of the present invention. FIG. 4 is a block diagram showing an exemplary structure of a photodetector 7 and a signal generator 9 thereof.

In this embodiment, a photodetector detects a return light L' by a light beam applied to an optical disc in such a manner that a target pre-format address and recorded information are distinguished from interference information by the pre-format addresses adjacent to the target pre-format address at its inner and outer peripheral sides. With this arrangement, the target pre-format address and the recorded information can be read from the optical disc with excellent reproducibility, and the crosstalk between adjacent pre-grooves can be prevented, even if the light beam is applied across adjacent information recording layers in accordance with the increase in a storage density of the optical disc.

An optical disc recording and reproducing apparatus 100 shown in FIG. 3 reads at least recorded information from an optical disc 10 based on pre-format addresses. Obviously, the recorded information has been recorded in the optical disc 10 beforehand based on the pre-format addresses. For example, in the case where the optical disc 10 is CD-R or CD-RW, its disc-shaped substrate is formed with pregrooves 1 in the form of pits and lands 2 in the shape of projections. The recorded information is written in the grooved portions of the pregrooves 1, and the pre-format addresses of the recorded information are frequency-modulated and are written so as to be wobbled (i.e. serpentine) on the side surfaces of each land 2 which coincide to each of the side surfaces of each pregroove 1. The optical disc recording and reproducing apparatus 100 has a light output device 6. The light output device 6 emits a light beam L with a specified intensity to the optical disc 10. The light output device 6 has a photodetector 7 in the state where the light beam emitted from the light output device 6 is adjusted to coincide to the light receiving axis of the photodetector 7 through an optical system 8. The return light L' (i.e. a reflected light) reflected by the optical disc 10 is detected in such a manner that the target pre-format address and the recorded information are distinguished from the interference information by the pre-format addresses adjacent to the target pre-format address at its inner and outer peripheral sides. To the return light L' from the optical disc 10, information to be read is reflected.

In this embodiment, the photodetector 7 shown in FIG. 3 has at least eight light receiving elements PD1 to PD 8 formed by splitting the light receiving region into four areas in a radial direction, and further split the four areas into two in a direction orthogonal to the radial direction. The eight light receiving elements PD1 to PD 8 are used for detecting a main spot created in a three-beam method. As the light receiving elements PD1 to PD8, photodiodes are used. A circle shown in FIG. 3 is a spot diameter of a return light (i.e. an incident light) L' applied across the eight light receiving elements PD1 to PD8. The light receiving elements PD1 to PD8 are arranged in matrix with 2 rows and 4 columns with reference to the light receiving axis (i.e. the incident light axis). At the center area around the light receiving axis, four light receiving elements PD1 to PD4 shown in FIG. 4 are arranged vertically and horizontally. The component of the return light, which reflects the target pre-format address and the recorded information, is detected by the four light receiving elements PD1 to PD4.

In FIG. 4 for example, in the photodetector 7, a light receiving signal Al is detected by the light receiving element PD1. A light receiving signal B1 is detected by the light receiving element PD2. A light receiving signal C1 is detected by the light receiving element PD3. A light receiving signal D1 is detected by the light receiving element PD4. In the spot diameter of the return light L' in the shape of a complete circle shown in FIG. 3, the detection of the return light is conducted for the portion in the shape of compressed ellipse, except for the upper and lower portions (i.e. crescent-shaped portions).

Two light receiving elements PD5 and PD8 are horizontally arranged above the light receiving elements PD1 to PD4. The light receiving elements PD5 and PD8 detect the component of the return light which reflects the interference information by the pre-format address adjacent to the target pre-format address at its outer peripheral side. For example, a light receiving signal A2 is detected by the light receiving element PD5, and a light receiving signal D2 is detected by the light receiving element PD8. In the spot diameter of the return light L' in the shape of complete circle shown in FIG. 3, the detection of the return light is conducted for the crescent-shaped portion at the outer peripheral side.

In addition, two light receiving elements PD6, PD7 are arranged horizontally below the light receiving elements PD1 to PD4. The light receiving elements PD6, PD7 detect the component of the return light which reflects the interference information by the pre-format address adjacent to the target pre-format address at the inner peripheral side. For example, a light receiving signal B2 is detected by the light receiving element PD6, and a light receiving signal C2 is detected by the light receiving element PD7. In the spot diameter of the return light L' in the shape of a complete circle shown in FIG. 3, the detection of the return light is conducted for the crescent-shaped portion at the inner peripheral side.

In this embodiment, a signal generator 9 is connected to the photodetector 9 (hereinafter, also referred to as an eight-split photodetector in some cases). The signal generator 9 generates various signals based on the outputs from the eight light receiving elements PD1 to PD8. For example, the signal generator 9 has eleven adder 301 to 310, 321, and three differential amplifiers 322 to 324 all of which constitute a matrix amplifier together. One of the plus terminals of each of the adders 301, 303 is connected to the output of the light receiving element PD1, and a light receiving signal A1 is input thereto. The other plus terminal of the adder 301 is connected to the output of light receiving element PD5, and a light receiving signal A2 is input thereto.

Similarly, one of the plus terminals of each of the adders 304, 306 is connected to the output of the light receiving element PD2, and a light receiving signal B1 is input thereto. The other plus terminal of the adder 306 is connected to the output of the light receiving element PD6, and a light receiving signal B2 is input thereto. In addition, the other plus terminal of the adder 304 and one of the plus terminals of the adder 305 are connected to the output of the light receiving element PD3, and a light receiving signal C1 is input thereto. The other plus terminal of the adder 305 is connected to the output of the light receiving element PD7, and a light receiving signal C2 is input thereto. The other plus terminal of the adder 303 and one of the plus terminals of the adder 302 are connected to the light receiving element PD4, and a light receiving signal D1 is input thereto. The other plus terminal of the adder 302 is connected to the output of the light receiving element PD8, and a light receiving signal D2 is input thereto.

Furthermore, one of the plus terminals of each of the adders 307, 310 is connected to the output of the adder 301, and an addition signal A1+A2 is input thereto. One of the plus terminals 308 and the other plus terminal of the adder 310 are connected to the output of the adder 302, and an addition signal A1+A2 is input thereto. One of the plus terminals of the adder 321 and the plus terminal of the differential amplifier 322 are connected to the output of the adder 303, and an addition signal A1+D1 is input thereto. The other plus terminal of the adder 321 and a minus terminal of the differential amplifier 322 are connected to the output of the adder 304, and an addition signal B1+C1 is input thereto. The adder 321 is operated so as to output an information reading signal SRF=A1+C1+C1+D1. The differential amplifier 322 is operated so as to output a wobble signal SWB=(A1+D1)−(B1+C1).

The other plus terminal of the adder 307 and one of the plus terminals of the adder 309 are connected to the output of the adder 305, and an addition signal C1+C2 is input thereto. The other plus terminal of the adder 308 and the other plus terminal of the adder 309 are connected to the output of the adder 306, and an addition signal B1+B2 is input thereto. A plus terminal of the differential amplifier 323 is connected to the output of the adder 307, and an addition signal A1+A2+C1+C2 is input thereto. A minus terminal of the differential amplifier 323 is connected to the output of the adder 308, and an addition signal B1+B2+D1+D2 is input thereto.

The differential amplifier 323 operates so as to output a focus error signal SFE=(A1+A2+C1+C2)−(B1+C1+D1+D2). A minus terminal of the differential amplifier 324 is connected to the output of the adder 309, and addition signal B1+B2+C+C2 is input thereto. A minus terminal of the differential amplifier 324 is connected to the output of the adder 310, and an addition signal A1+A2+D1+D2 is input thereto. The differential amplifier 324 operates to output a tracking error signal STE=(A1+A2+D1+D2)−(B1+C1+C1+C2).

Next, exemplary operation of the optical disc recording and reproducing apparatus 100 according to an embodiment of the present invention will be described. The description will be made, for example, on an assumption that recorded information is read from the optical disc 10. In this case, the light output device 6 emits a light beam L to the optical disc 10 based on the pre-format addresses. Then, the return light L' which reflects the information to be read from the optical disc 10 is detected by the photodetector 7 in such a manner that the target pre-format address and the recorded information are distinguished from the interference information by the pre-format address adjacent to the target pre-format address at its inner and outer peripheral sides.

The output from the photodetector 7 is input to the signal generator 9. For example, a light receiving signal Al generated in the light receiving element PD1 is output to the adders 301, 303 of the signal generator 9. A light receiving signal A2 generated in the light receiving element PD5 is output to the adder 301. A light receiving signal B1 generated in the light receiving element PD2 is output to the adders 304, 306. A light receiving signal B2 generated in the light receiving element PD6 is output to the adder 306. A light receiving signal C1 generated in the light receiving element PD3 is output to the adders 304, 305. A light receiving signal C2 generated in the light receiving element PD7 is output to the adder 305.

A light receiving signal D1 generated in the light receiving element PD4 is output to the adders 303, 302. A light receiving signal D2 generated in the light receiving element PD8 is output to the adder 302. As a result of these processes, an addition signal A1+A2 generated in the adder 301 is output to each of the adders 307, 310. An addition signal A1+A2 generated in the adder 302 is output to each of the adders 308, 310. An addition signal A1+D1 generated in the adder 303 is output to the adder 321 and the differential amplifier 322. An addition signal B1+C1 generated in the adder 304 is output to the adder 321 and the differential amplifier 322. As a result of these processes, an information reading signal (hereinafter, also referred to as an FR signal in some cases) SRF=A1+B1+C1+D1 is output from the adder 321. A wobble signal SWB=(A1+D1)−(B1+C1) is output from the differential amplifier 322.

Furthermore, an addition signal C1+C2 generated in the adder 305 is output to the adders 307, 309. An addition signal B1+B2 generated in the adder 306 is output to each of the adders 308, 309. An addition signal A1+A2+C1+C2 generated in the adder 307 is output to the differential amplifier 323. An addition signal B1+B2+D1+D2 generated in the adder 308 is output to the differential amplifier 323. As a result of these processes, a focus error signal SFE= (A1+A2+C1+C2)−(B1+B2+D1+D2) is output from the differential amplifier 323.

An addition signal B1+B2+C1+C2 generated in the adder 309 is output to the differential amplifier 324. An addition signal A1+A2+D1+D2 generated in the adder 310 is output to the differential amplifier 324. As a result of these processes, a tracking error signal STE=(A1+A2+D1+D2)− (B1+B2+C1+C2) is output from the differential amplifier 324.

In the above-described manner, the interference information by the pre-format addresses adjacent to the target pre-format address at its inner and outer peripheral side is removed from the information read from the optical disc 10, and whereby only the recorded information of the target pre-format address can be taken out from the signal generator 9. As a result, even if the light beam L is applied across the information recording layers adjacent to each other in accordance with the increase in the recording density of the optical disc 10, the occurrence of crosstalk can be prevented without damaging the function of tracking error detection and the function of focus error detection.

(2) Example

Figure 5:
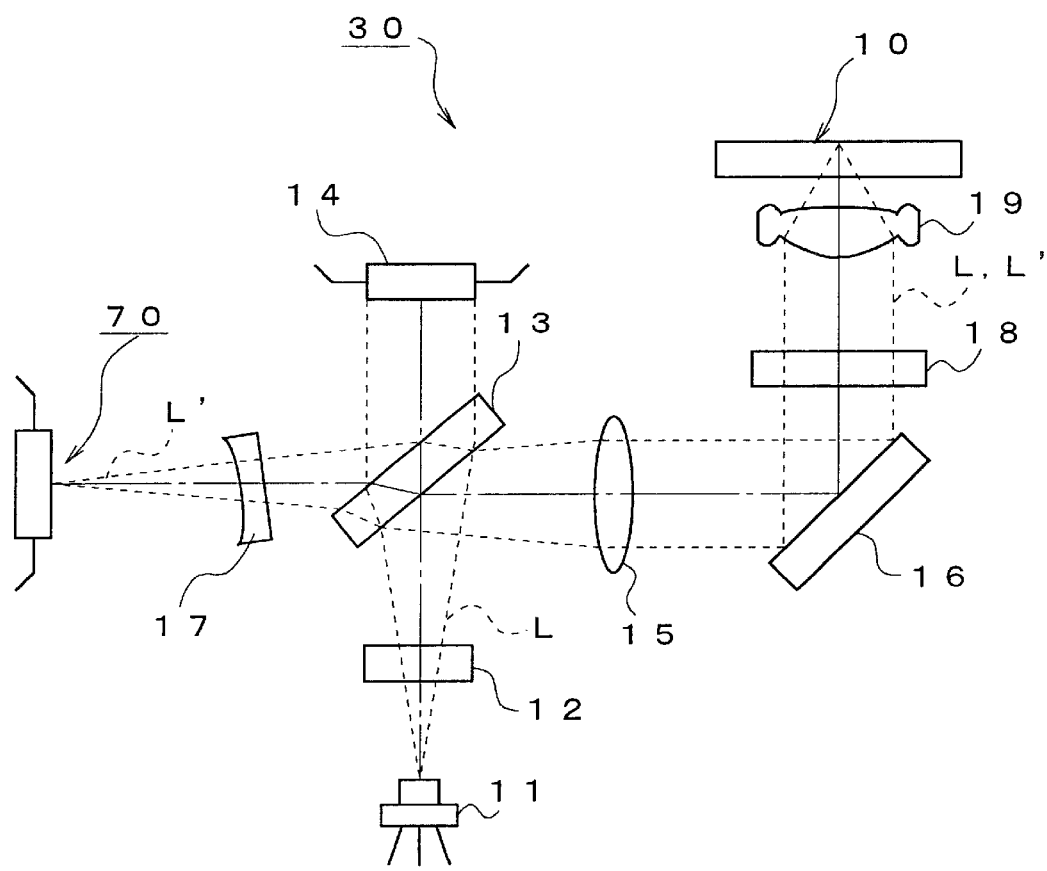
FIG. 5 is a conceptual diagram showing an exemplary structure of an optical pickup 300 to be mounted to an optical disc recording and reproducing apparatus 200 according to an example.

FIG. 5 is a conceptual diagram showing an exemplary structure of an optical pickup 30 to be mounted to an optical disc recording and reproducing apparatus 200 according to an example.

The optical pickup 30 shown in FIG. 5 has a laser emission source 11 as an example of a light output device. As the laser emission source 11, a GaAs semiconductor laser having a wavelength of about 780 nm and the like is used. The laser emission source 1 emits a laser beam L which constitutes a main spot created in a three beam method. The laser emission source 11 has an optical axis. On the optical axis, a grating (i.e. a diffraction grating) 12, a beam splitter 13, and a light receiving element 14 for front monitor which constitute an optical system together are provided. In the grating 12, the laser beam L emitted from the laser emission source 11 is separated into one main beam and two side beams. The main beam and the side beams are monitored by the light receiving element 14 through the beam splitter 13.

A collimator lens 15 and a mirror adjacent to the collimator lens 15 are provided on the right side of the beam splitter 13 on the optical axis which extends from the beam splitter 13 as a starting point and is orthogonal to the optical axis of the laser emission source 11, and a concave lens 17 and a photodetecting section 70 adjacent to the concave lens 17 are provided on the left side of the beam splitter 13 on the optical axis which extends from the beam splitter 13 as a starting point and is orthogonal to the optical axis of the laser emission source 11. The laser beam L is polarized by 90 degree by the beam splitter 13, and is formed into a parallel luminous flux by the collimator lens 15, and is applied to the mirror 16. On the optical axis polarized by 90 degree by the mirror 16, a one fourth wave plate 18, and an objective lens 19 adjacent to the one fourth wave plate 18 are provided. The phase shift of the laser beam L is compensated by the one fourth wave plate 18, and thus-obtained laser beam L is applied to the pregrooves (i.e. recording tracks) of the optical disc 10 through the objective lens 19. The one fourth wave plate 18 may be omitted. The objective lens 19 has a numerical aperture NA which shows the performance of lens, as is the case of a microscope.

Figure 10:
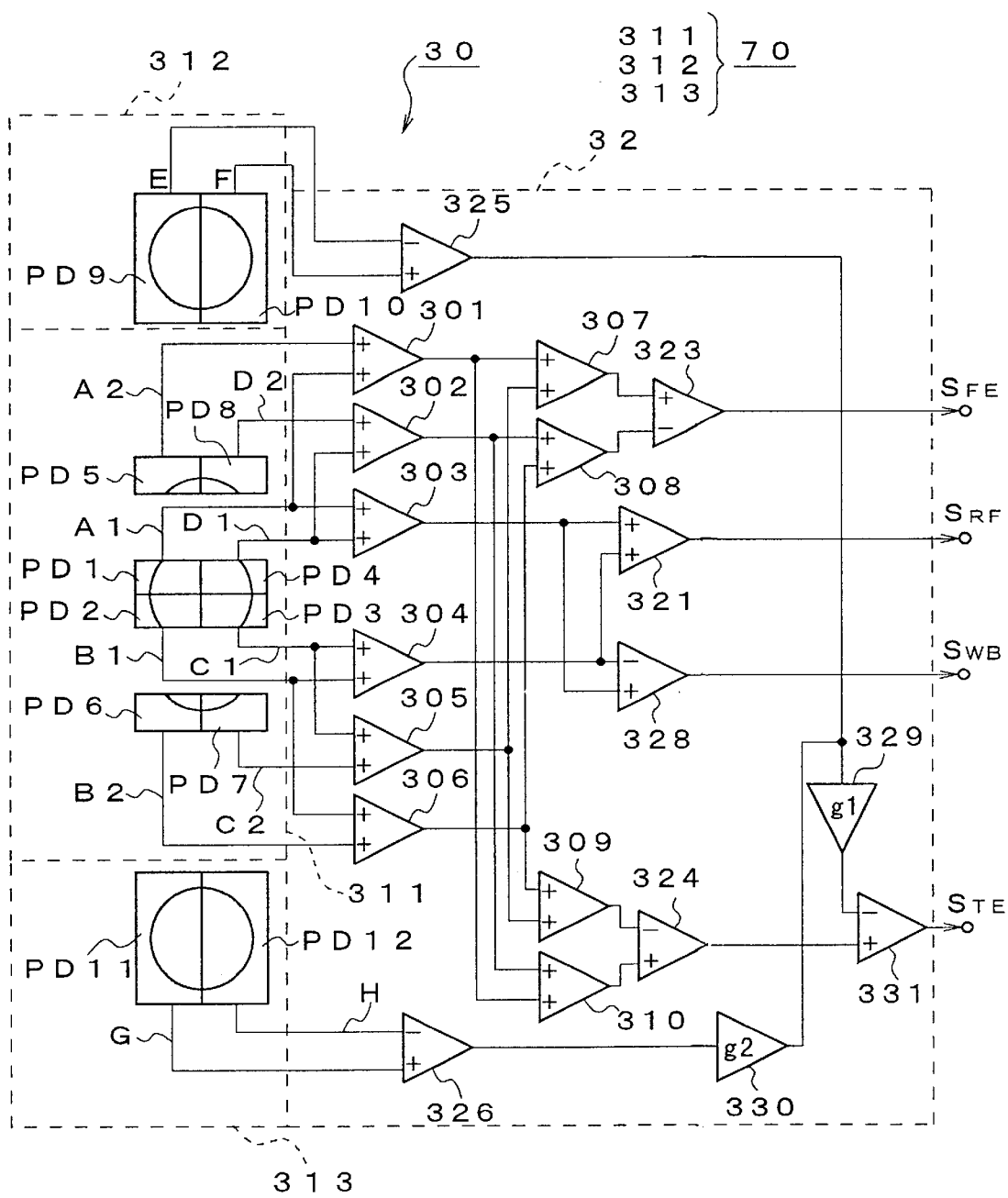
FIG. 10 is a block diagram showing an exemplary structure of an eight-split photodetector 311, two-split photodetectors 312, 313, and an RF amplifying section 32 which are to be used for the optical pickup 30.

When the laser beam L is reflected by the optical disc 10, the return light L' thereof passes through the objective lens 19, the one fourth wave plate 18, the mirror 17, the collimator lens 15, the beam splitter 13, and the concave lens 17, and then is detected by the photodetecting section 70. In the photodetecting section 70, the photodetector 7 for detecting the main spot which has been described in the embodiment is used. Obviously, when a differential push-pull method (hereinafter, simply referred to as a DPP method) is employed, on top of the eight light receiving elements PD1 to PD8 constituting the photodetector 7, two light receiving elements PD9, PD10 for preceding spot, and two light receiving elements PD11, PD12 for posterior spot which will be described later with reference to FIG. 10 are additionally provided.

Figure 6A:
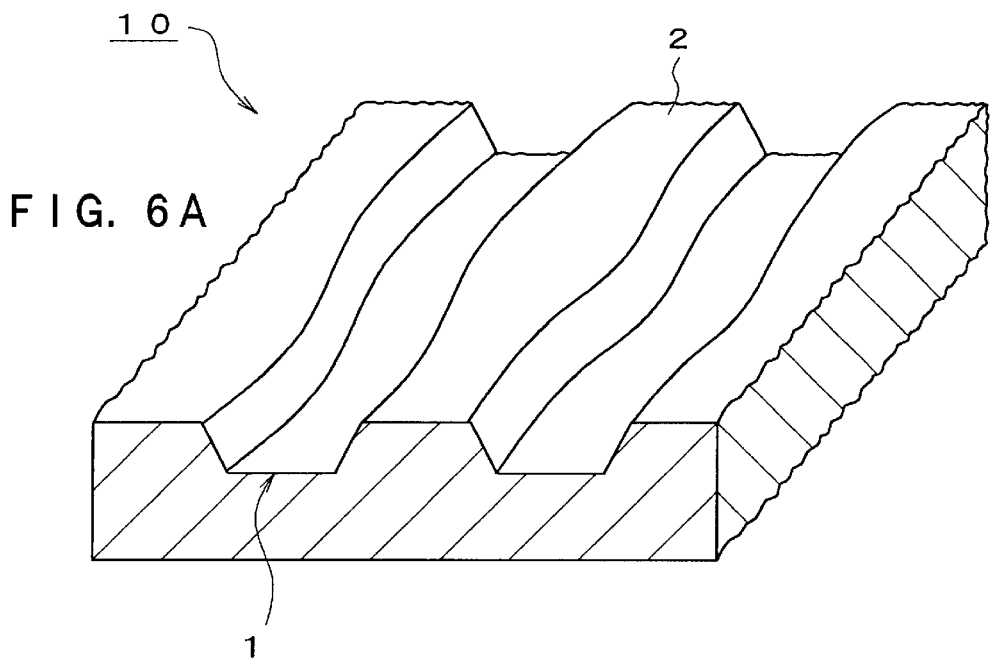
FIGS. 6A and 6B are diagrams respectively showing an exemplary structure of an optical disc 10 for which an optical pickup 30 is employed, and an example of the irradiation of three beams.

Next, an exemplary structure of the optical disc 10 to which the optical pickup 30 is applied, and an example of irradiation of three beams will be described. The optical disc 10 shown in FIG. 6A is a write once optical disc (CD-R), or a rewritable optical disc (CD-RW). FIG. 6A is a diagram showing a portion of the optical disc 10 partially cut therefrom and enlarged. Herein, the portion between two adjacent pregrooves 1 is defined as a land 2. The disc 10 has pregrooves 1 which spirally extend from the inner peripheral section toward the outer peripheral section around an unillustrated hole for fastening the optical disc 10 as a center. When data (i.e. information) is recorded and reproduced, the laser beam L is induced along the pregrooves 1. The pregrooves 1 are defined (i.e. partitioned) by the lands 2, and are slightly serpentine (i.e. wobbled) in the form of sine wave. Each pregroove 1 has a pigment layer to be a recording layer, and a reflection layer made of gold and the like is formed on the land 2 and the pregroove 1 so as to cover the pigment layer 12. The upper surface of the reflection layer is protected by a protective layer. In this manner, the optical disc 10 such as CD-R and CD-RW is constituted.

Figure 6B:
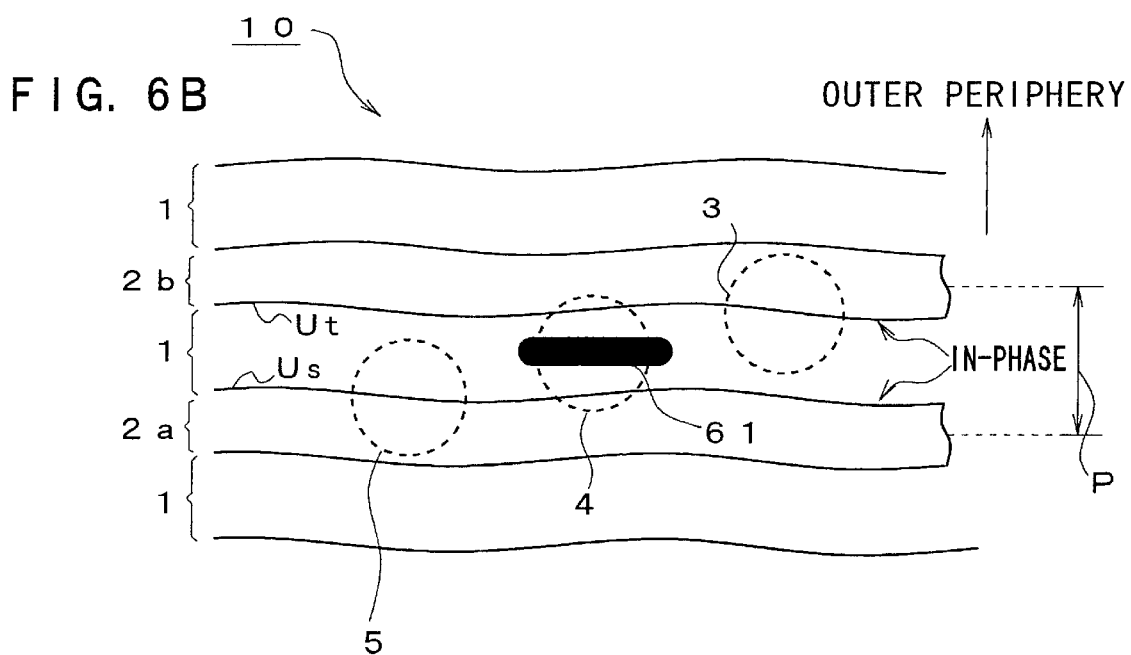

Each side surface of the pregroove 1, which coincides to each sloped surface of the land 2 shown in FIG. 6A, is formed with a slight wobble in the form of sine wave, as shown in an example of irradiation of three beams of FIG. 6B. The wobble component is based on the control signal for groove formation at the time of manufacturing the original disc for the optical disc 10, and has been subjected to FM modulation. The broken line circles in FIG. 6B show spot diameters of the laser beam L, and indicate the case where the irradiation diameters thereof are relatively enlarged as the pregrooves are formed so as to be closer to each other in proportional to the increase in a storage density of the optical disc 10.

In the manufacturing of the original disc for the optical disc 10, the pre-format addresses are subjected to baseband modulation in a modulation mode referred to as a bi-phase to produce a bi-phase signal DBP. Based on the bi-phase signal DBP, a control signal for groove formation is produced. Based on the control signal, a light beam with a predetermined intensity is caused to oscillate on the original disc in its inner and outer peripheral directions. At the same time, grooves are formed on the original disc in the state where the original disc is rotated at a predetermined linear velocity to define the pregrooves 1 and the land 2 on the original disc. As a result of these processes, in the original disc, pre-format addresses (hereinafter, also referred to as time axis information in some cases) are written, and a recommended value of the power of the laser beam optimum for recording is encoded. By use of thus-obtained original disc, the optical disc 10, so-called a blank disc, is produced.

The time axis information is constituted by at least synchronization information, minutes information, second information, frame information, and error correction information in one frame. Hereinafter, the time axis information for all frames is also referred to as ATIP (Absolute Time In Pregroove) information in some cases. The ATIP information is written, for example, in the both side surfaces Us, Ut of the pregroove 1 between two lands 2a, 2b shown in FIG. 6B, that is, in the side surface Us of the land 2a located at the inner peripheral side of the pregroove 1, and in the side surface Ut of the land 2b located at the outer peripheral side of the pregroove 1 in such a manner that the ATIP information written in the side surface Us is synchronous with the ATIP information written in the side surface Ut. Therefore, each ATIP information can be read as a wobble signal SWB by detecting the shape of the wobble formed in the land 2b located at the outer peripheral side at a preceding side spot 3.

The preceding side spot 3 is a light beam preceding a main spot 4 which is a laser beam L for recording and reading information. The wobble formed in the land 2a located at the inner peripheral side is detected as a wobble signal SWB by a posterior side spot 5. The wobble signal SWB is produced in such a manner that its center frequency becomes 22.05 kHz for example, when the disc is rotated at a standard velocity (CLV) of a compact disc (CD). One sector of the ATIP information is constituted in such a manner as to coincide to one data sector (2352 byte) after the signal is recorded. Therefore, at the time of recording information, data is written in the state where the sector of the ATIP information is synchronous with the data sector. For example, when a pre-format address is designated, the pregroove 1 is irradiated with a laser beam L with a predetermined intensity, and the information is written.

An exemplary relationship between the ATIP information, the bi-phase signal DBP and the wobble signal SWB is described. The ATIP information shown in FIG. 7A is subjected to bi-phase modulation, and is adjusted so that the logical levels "1" and "0" are exchanged with each other per a predetermined period, and also the average numbers of "1" and "0" become identical to each other. As a result of the bi-phase modulation, a bi-phase signal DBP shown in FIG. 7B is obtained. The bi-phase signal DBP is then subjected to FM modulation to be a wobble signal (i.e. a control signal for groove formation) SWB. That is, FM modulation is conducted in such a manner that, when the logical level of the bi-phase signal DBP is "1", the frequency is adjusted to 23.05 kHz, and when the logical level of the bi-phase signal DBP is "0", the frequency is adjusted to 21.05 kHz. As a result, the wobble signal SWB shown in FIG. 7C having a carrier signal which has been subjected to FM modulation in such a manner that its center frequency is 22.05 kHz as described above is produced.

Figure 8:
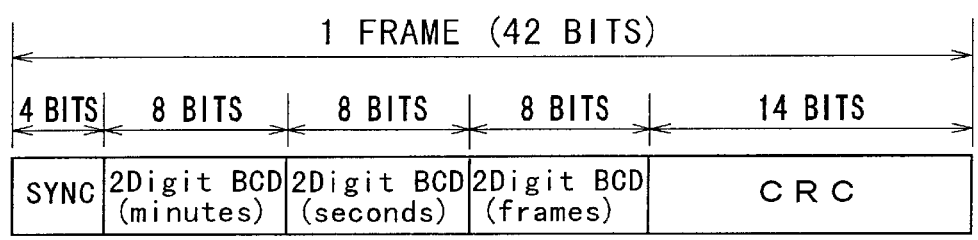
FIG. 8 is a diagram of data format showing an exemplary frame structure of ATIP information constituting pre-format addresses.

Hereinafter, an exemplary frame structure of the ATIP information constituting the pre-format addresses will be described. In the ATIP information shown in FIG. 8, the first four bits constitute synchronous information which is a synchronous signal SYNC. The next eight bits constitute minute information indicated by 2 digit BCD. The subsequent eight bits constitute second information indicated by 2 digit BCD. The further subsequent eight bits constitute frame information indicated by 2 digit BCD. The last 14 bits constitute error correction information indicated by cyclic redundancy code (CRC). The pre-format address in one frame is constituted by 42 bits. The information such as the recommended value of the power of the laser beam optimum for recording its multiplexed so as to be contained in the time axis information at a certain ratio.

Next, an exemplary structure of an optical disc recording and reproducing apparatus 200 to which an optical pickup 30 is mounted will be described.

An optical disc recording and reproducing apparatus 200 has an optical pickup 30. The optical disc 10 is operated to rotate at a specified velocity by a spindle motor 22. The spindle motor 22 is driven so that it allows the optical disc 10 to rotate at a specified velocity by a spindle driving signal SSD provided from a spindle motor driving section 23 which will be described later.

The optical disc 10 is irradiated with a laser beam L of which amount of light is controlled by the optical pickup 30 in the optical disc recording and reproducing apparatus 200. The laser beam L is reflected by the optical disc 10, and then is detected by a photodetecting section 70 in the optical pickup 30 (see FIG. 5).

In the photodetecting section 70, the eight-split photodetector 7 for detecting the return light L' of the main spot 4, such as that described above referring to FIG. 4 is used. The function thereof is as has been described above in the embodiment. When a DPP method is employed, the photodetecting section 70 constituted by, as shown in FIG. 10, an eight-split photodetector 311, a two-split phtodetector 312 for detecting a return light from the preceding side spot 3, a two-split photodetector 313 for detecting a return light L' of the posterior side spot 5 may be used. A voltage signal produced as a result of current-voltage conversion in each of the split photodetectors 311 to 313 is supplied to an RF amplifying section 32.

In the RF amplifying section 32, a tracking error signal STE is generated by a differential push-pull method capable of producing a tracking error signal containing almost no variation in direct current.

An output from the eight-split photodetector 311 is input into the RF amplifying section 32. For example, a light receiving signal A1 produced in the light receiving element PD1 is output to the adders 301, 303 in the RF amplifying section 32. A light receiving signal A2 produced in the light receiving element PD5 is output to the adder 301. A light receiving signal B1 produced in the light receiving element PD2 is output to the adders 304, 306. A light receiving signal B2 produced in the light receiving element PD6 is output to the adder 306. A light receiving signal C1 produced in the light receiving element PD3 is output to the adders 304, 305. A light receiving signal C2 produced in the light receiving element PD7 is output to the adder 305.

A light receiving signal DI produced in the light receiving element PD4 is output to the adders 303, 302. A light receiving signal D2 produced in the light receiving element PD8 is output to the adder 302. As a result of these processes, an addition signal A1+A2 produced in the adder 301 is output to each of the adders 307, 310. An addition signal A1+A2 produced in the adder 302 is output to the adders 308, 310. An addition signal A1+D1 produced in the adder 303 is output to the adder 321. An addition signal B1+C1 produced in the adder 304 is output to the adder 321. As a result of these processes, an FR signal (i.e. an information reading signal) SRF=A1+B1+C1+D1 is output from the adder 321.

Furthermore, an addition signal C1+C2 produced in the adder 305 is output to the adders 307, 309. An addition signal B1+B2 produced in the adder 306 is output to each of the adders 308, 309. An addition signal A1+A2+C1+C2 produced in the adder 307 is output to the differential amplifier 323. An addition signal B1+B2+D1+D2 produced in the adder 308 is output to the differential amplifier 323. As a result of these processes, a focus error signal SFE=(A1+A2+C1+C2)−(B1+B2+D1+D2) is output from the differential amplifier 323.

An addition signal B1+B2+C1+C2 produced in the adder 309 is output to the differential amplifier 324. An addition signal A1+A2+D1+D2 produced in the adder 310 is output to the differential amplifier 324. As a result of these processes, a signal of the difference between these signals (A1+A2+D1+D2)−(B1+B2+C1+C2) is output from the differential amplifier 324.

In the two-split phtodetector 312 for detecting the return light (i.e. a reflected light) of the preceding side spot 3, a light receiving signal E produced in the light receiving element PD9, and a light receiving signal F produced in the light receiving element PD10 are provided to a differential amplifier 325 in the RF amplifying section 32. In the differential amplifier 325, the difference between the light receiving signal E and the light receiving signal F is amplified, and the signal of the difference therebetween is supplied to a differential amplifier 331 through an amplifier 329 having a predetermined gain g1.

A light receiving signal G produced in the light receiving element PD11, and a light receiving signal H produced in the light receiving element PD12 in the two-split photodetector 313 are supplied to a differential amplifier 326 in the RF amplifying section 32. In the differential amplifier 326, the difference between the light receiving signal G and the light receiving signal H is amplified, and the signal of the difference therebetween is supplied to the differential amplifier 331 through an amplifier 330 having a predetermined gain g2 and an amplifier 329 having a predetermined gain g1. As a result of these processes, a tracking error signal STE=(A1+A2+D1+D2)−(B1+B2+C1+C2)−g1{(F−E)+g2(G−H)} is output from the differen signal SWB=(A1+D1)−(B1+C1) is output from the differential amplifier 328, as is the case of the example shown in FIG. 4.

Figure 11:
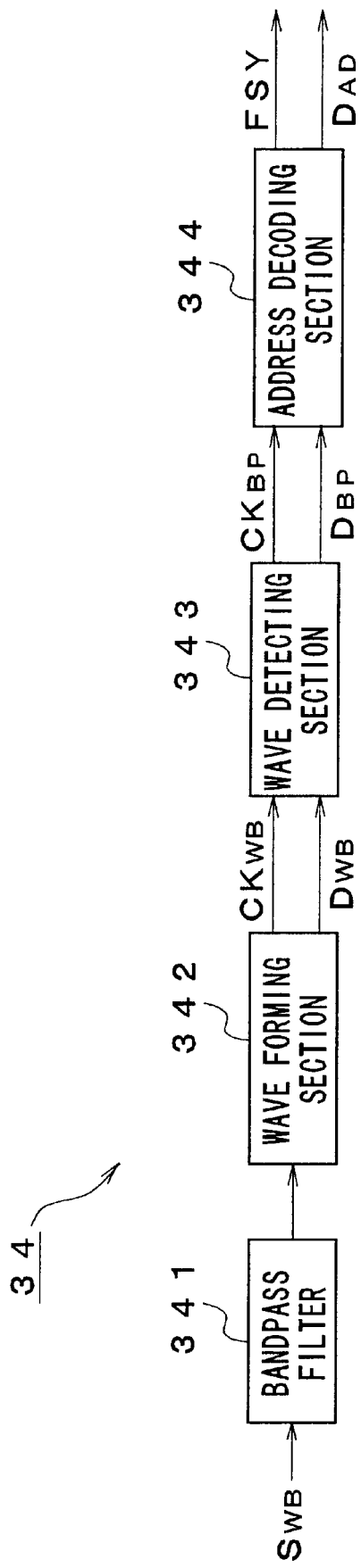
FIG. 11 is a block diagram showing an exemplary structure of an ATIP decoder 34.

In the above-described manner, the RF signal SRF, the tracking error signal STE, and the focus error signal SFE produced in the RF amplifying section 32 are supplied to a clock generating/servo controlling section 33 shown in FIG. 9. The wobble signal SWB is supplied to an ATIP decoder 34 shown in FIG. 11.

Referring to FIG. 9 again, in the clock generating/servo controlling section 33, a focus control signal SFC is generated based on the focus error signal SFE provided from the RF amplifying section 32. The focus control signal SFC is used for controlling the objective lens 19 of the optical pickup 30 to allow the laser beam L to be focused to a position in the recording layer of the optical disc 10 (see FIG. 5). Then, the focus control signal SFC is supplied to a driver 35. In addition, in the servo controlling section 33, a tracking control signal STC is generated based on the tracking error signal STE supplied from the RF amplifying section 32. The tracking control signal STC is used for controlling the objective lens 19 of the optical pickup 30 to allow the laser beam L to be applied to a center position in a desired track. Then, the tracking control signal STC is supplied to the driver 35.

In the driver 35, a focus driving signal SFD is produced based on the focus control signal SFC, and a tracking driving signal STD is produced based on the tracking control signal STC. The produced focus driving signal SFD and the tracking driving signal STD are supplied to an actuator (not shown) in the optical pickup 30, and as a result of this, the position of the objective lens 19 is controlled to allow the laser beam L to be focused to the center position in a desired track.

Also, in the clock generating/servo controlling section 33, the RF signal SRF supplied from the RF amplifying section 32 is asymmetrically corrected and binarized to be converted into a digital signal. The digital signal is supplied to a data processing section 40 as a data reading signal DRF. In addition, a clock signal CKRF synchronous with the above-described digital signal is produced. Thus-produced clock signal CKRF is supplied to the data processing section 40.

In addition, in the clock generating/servo controlling section 33, a sled control signal SSC for allowing the optical pickup 30 to move in a radial direction of the optical disc 10 is generated. The sled control signal SSC is supplied to a sled section 36. This process is conducted in order to prevent the laser beam L from being applied beyond the region determined by the tracking control. In the sled section 36, a sled motor is driven based on the sled control signal SSC to allow the optical pickup 30 to move in a radial direction of the optical disc 10.

Hereinafter, an exemplary structure of an ATIP decoder 34 to which the wobble signal SWB is supplied will be described. In this example, the ATIP decoder 34 shown in FIG. 11 has a bandpass filter 341, a wave forming section 342, a wave detecting section 343, and an address decoding section 344. The wobble signal SWB1 is supplied to the bandpass filter 341 in the ATIP decoder 34. In the bandpass filter 341, the wobble signal SWB of which band is limited so that a wobble component and a wobble component produced by the posterior side spot 5 are extracted. Then, the wobble signal SWB is supplied to the wave forming section 342.

In the wave forming section 342, a clock signal CKWB synchronous with a carrier component is generated from the wobble signal SWB, and at the same time, the wobble signal SWB is binarized. Thus-produced clock signal CKWB, and the wobble information DWB obtained by binarizing the preceding wobble component are supplied to the wave detecting section 343.

In the wave detecting section 343, the wobble information DWB is demodulated using the clock signal CKWB to produce a bi-phase signal DBP, and a clock signal CKBP synchronous with the bi-phase signal DBP is produced. Thus-produced bi-phase signal DBP and the clock signal CKBP are supplied to an address decoding section 344.

In the address decoding section 344, the bi-phase signal DBP is demodulated using the clock signal CKBP to produce a pre-format address DAD. In addition, in the address decoding section 344, a synchronization pattern of the pre-format address DAD is detected to produce an ATIP synchronization detecting signal FSY. The pre-format address DAD is supplied to a controlling section 50, and the ATIP synchronization detecting signal FSY is supplied to the spindle motor driving section 23.

Referring to FIG. 9 again, in the data processing section 40, the data reading signal DRF is EFM-demodulated, and an error correction is conducted in a RAM 41 by employing a deinterleave processing and a cross interleave reed-solomon code (CIRC). In addition, an error correction by employing a descramble processing and an error correction code (ECC) is also conducted. The data signal obtained after the error Ad correction is stored in a RAM 42 as a buffer memory, and then is supplied as a reproducing data signal RD to an external computer through an interface 43.

In the data processing section 40, a frame synchronization signal FSZ is detected from the data signal obtained after EFM demodulation is detected. The detected frame synchronization signal FSZ is supplied to the spindle motor driving section 23. In the spindle motor driving section 23, the ATIP synchronization detecting signal FSY from the ATIP decoder 34 is used when a signal is recorded in the optical disc 10. Contrary to this, the frame synchronization signal FSZ from the data processing section 40 or the ATIP synchronization detecting signal FSY from the ATIP decoder 34 is used when information is read from the optical disc 10. As a result, a spindle driving signal SSD for operating the optical disc 10 to rotate at a desired velocity is produced. By supplying the spindle driving signal SSD produced in the spindle motor driving section 23 to the spindle motor section 22, the optical disc 10 is operated to rotate at a desired velocity.

Furthermore, in the data processing section 40, when a data recording signal WD is supplied from an external computer through the interface 43, the data recording signal WD is temporality stored in a RAM 42. At the same time, the data recording signal WD stored in the RAM 42 is encoded into a predetermined sector format, and addition processing is conducted to an error correcting code (ECC) for error correction. In addition, in the data processing section 40, a CIRC encoding and an EFM modulation are also conducted to produce a write signal DW. Thus-produced writing signal DW is supplied to a write compensating section 37.

In the write compensating section 37, a laser driving signal LAD is produced based on the write signal DW supplied from the data processing section 40. The laser driving signal LAD is supplied to the laser emission source (i.e. a laser diode) 11 in the optical pickup 30. Here, in the write compensating section 37, a signal level of the laser driving signal LAD is corrected based on a power compensating signal PC from a controlling section 50 which will be described later in accordance with the characteristics of the recording layer of the optical disc 10, the shape of the spot of the laser beam L, the linear velocity at which the recording is conducted, and the like. Then, the power of the laser beam L emitted from the laser emission source 11 in the optical pickup 30 is optimized to record the signal.

A ROM 51 is connected to the controlling section 50 described above. The ROM 51 controls the operation of the optical disc recording and reproducing apparatus 200 based on the program for operation control stored in the ROM 51. For example, the controlling section 50 judges the position where the reproduction is conducted and the position where the recording is conducted based on a subcode signal DSQ produced in the data processing section 40 and the pre-format address DAD from the ATIP decoder 34. Then, the controlling section 50 supplies a control signal CTA to the clock generating/servo controlling section 33, a control signal CTB to the data processing section 40, and the like to conduct a data recording and reproducing operation.

Furthermore, the controlling section 50 produces a power compensating signal PC based on the information for setting the recording laser power shown by the pre-format address DAD, and supplies the power compensating signal PC to the write compensating section 37. In addition to this process, a control signal CTC is supplied from the controlling section 50 to the RF amplifying section 32. The RF amplifying section 32 conducts an on-off control for the laser emission source 11 in the optical pickup 30, and superimposes a high frequency onto the laser beam L in order to reduce a laser noise and a disturbance to the RF signal.

Next, an exemplary operation of the optical disc recording and reproducing apparatus 200 will be described. In this example, the description will be made on an assumption that the recording and reproduction of the signal is conducted in the state where the optical disc 10 shown in FIG. 6A is mounted to the optical disc recording and reproducing apparatus 200. In addition, it is also assumed that the information which has been recorded in the optical disc 10 based on the pre-format addresses is read therefrom.

① At the Time of Recording Information Into the Optical Disc 10:

In this case, the shape of wobble is read by use of the main spot 4 shown in FIG. 6B, and the wobble signal SWB is reproduced. Based on the wobble signal SWB, the optical disc 10 is operated to rotate at a specified velocity, and at the same time, the pre-format address of the track where the main spot 4 is positioned is found. Based on the result of the finding of the address, the irradiation position of the laser beam L is controlled so that the main spot 4 is positioned on a desired track. When the main spot 4 is positioned on a desired track, the writing of data is started. During the period when no writing of data is conducted, the reading of time axis information is conducted in the main spot 4 based on the wobble signal SWB.

② At the Time When the Information is Reproduced From the Optical Disc 10:

In this case, the optical disc 10 is irradiated with the laser beam L based on the pre-format addresses. The optical pickup 30 detects the return light L' reflected by the optical disc 10 in such a manner that the component of the return light (A1+D1, B1+C1) which reflects the target pre-format address and the recorded information are distinguished from the component of the return light (A2+D2, B2+C2) containing an interference signal by the pre-format address adjacent to the target preformat address at its inner and outer peripheral sides.

As a result, the rotation of the optical disc 10 is controlled based on the RF signal SRF produced by the optical pickup 30. Since the position to be reproduced can be clarified from the subcode signal DSQ produced based on the RF signal SRF, a desired data can be read by use of the information as to the position to be reproduced.

As described above, in the optical disc recording and reproducing apparatus 200 according to the example of the present invention, the interference information by the pre-format addresses adjacent to the target pre-format address at its inner and outer peripheral side is removed from the information read from the optical disc 10, and whereby only the RF signal (i.e. the recorded information) SRF of the target pre-format address can be taken out. As a result, even if the light beam L is applied across the information recording layers adjacent to each other in accordance with the increase in the recording density of the optical disc 10, the occurrence of crosstalk can be prevented without damaging the function of tracking error detection and the function of focus error detection.

Even if there is a limitation in reducing the diameter of the beam spot into a smaller value by shortening the wavelength of the laser beam or by increasing the numerical aperture (NA) of the objective lens 19 in an attempt to satisfy the demand for increasing the record density of the optical disc 10, the crosstalk between adjacent tracks can be prevented, and thereby enhancing the information reading performance of the optical disc recording and reproducing apparatus 200.

In the above description, the pre-format addresses are read by use of the main spot 4 alone, because a differential push-pull method is employed for generating the tracking error signal STE. Alternatively, the present invention may be constructed so that the pre-format addresses are read by use of the side spot 3 which is used for generating the tracking error signal STE.

With this arrangement, the interference information by the preformat addresses adjacent to the target pre-format address at its inner and outer peripheral side is removed from the information read from the optical disc, and whereby only the recorded information of the target pre-format address can be taken out.

The present invention is extremely preferable when applied to a writable optical disc such as write once optical disc (CD-R) or a rewritable optical disc (CD-RW).

What is claimed is:

1. An optical disc apparatus for recording information and reproducing the recorded information in an optical disc having addresses formed beforehand, and the information being to be recorded into the optical disc based on the addresses, comprising:

a light output device for emitting a light beam to the optical disc; and a photodetector for detecting a return light which is reflected by the optical disc and contains information to be read, in such a manner that a target address and the recorded information are distinguished from interference information which is owing to addresses adjacent to the target address at its inner and outer peripheral side, wherein the photodetector at least comprises eight light receiving elements, and the light receiving elements are arranged in matrix with 2 rows and 4 columns with reference to the light receiving axis, wherein the eight light receiving elements in the photodetector are constituted by:

four light receiving elements which are arranged vertically and horizontally in a center area around a light receiving axis, and are used for detecting a component of the return light which reflects the target pre-format address and the recorded information; and the other four light receiving elements, two of which are arranged at one side of the four light receiving elements, and the other two are arranged at the other opposing side of the four light receiving elements, being used for detecting a component of the return light containing the interference information which is owing to the pre-format addresses adjacent to the target pre-format address at its inner and outer peripheral sides.

2. An optical disc apparatus for recording information and reproducing the recorded information in an optical disc having addresses formed beforehand, and the information being to be recorded into the optical disc based on the addresses, comprising:

a light output device for emitting a light beam to the optical disc; and a photodetector for detecting a return light which is reflected by the optical disc and contains information to be read, in such a manner that a target address and the recorded information are distinguished from interference information which is owing to addresses adjacent to the target address at its inner and outer peripheral side, wherein the photodetector at least comprises eight light receiving elements, and the light receiving elements are arranged in matrix with 2 rows and 4 columns with reference to the light receiving axis, comprising a signal generator for producing various signals based on an output from the photodetector, wherein the signal generator produces an RF signal and a wobble signal indicating the addresses based on the outputs from the four light receiving elements arranged vertically and horizontally in a center area around the light receiving axis of the photodetector; and the signal generator also produces a tracking error signal or a focus error signal based on the outputs from the eight light receiving elements of the photodetector.

3. A method for reading information from an optical disc having addresses formed beforehand, and the information being recorded in the optical disc based on the addresses, comprising the steps of:

irradiating the optical disc with a light beam; and detecting a return light which is reflected by the optical disc and contains information to be read using a photodetector, in such a manner that a target address and the recorded information are distinguished from interference information which is owing to addresses adjacent to the target address at its inner and outer peripheral sides, wherein the photodetector at least comprises eight light receiving elements, and the light receiving elements are arranged in matrix with 2 rows and 4 columns with reference to the light receiving axis, wherein the eight light receiving elements in the photodetector are constituted by:

four light receiving elements which are arranged vertically and horizontally in a center area around a light receiving axis, and are used for detecting a component of the return light which reflects the target pre-format address and the recorded information; and the other four light receiving elements, two of which are arranged at one side of the four light receiving elements, and the other two are arranged at the other opposing side of the four light receiving elements, being used for detecting a component of the return light containing the interference information which is owing to the pre-format addresses adjacent to the target pre-format address at its inner and outer peripheral sides.

* * * * *

UNITED STATES PATENT AND TRADEMARK OFFICE
CERTIFICATE OF CORRECTION

PATENT NO. : 6,545,959 B1
DATED : April 8, 2003
INVENTOR(S) : Michihiko Iida

It is certified that error appears in the above-identified patent and that said Letters Patent is hereby corrected as shown below:

Column 1,
Line 43, change "for med" to -- formed --.
Line 50, change "MTIP" to -- ATIP --.

Column 3,
Between lines 53 and 54, after "accurately" insert heading -- SUMMARY OF THE INVENTION --.

Column 12,
Line 55, change "DI" to -- D1 --.

Column 13,
Line 41, change "differen signal SWB=(A1+D1)-" to -- differential amplifier 331. A wobble signal SWB=(A1+D1)- --.

Column 15,
Line 1, delete "Ad".

Signed and Sealed this

Eleventh Day of November, 2003

JAMES E. ROGAN
*Director of the United States Patent and Trademark Office*